(12) United States Patent
Huang et al.

(10) Patent No.: US 7,907,374 B2
(45) Date of Patent: Mar. 15, 2011

(54) ELECTROSTATIC DISCHARGE PREVENTION CIRCUITS

(75) Inventors: Mine-Yuan Huang, Taipei (TW); Chun Chang, Taipei (TW)

(73) Assignee: Princeton Technology Corporation, Taipei County (TW)

( * ) Notice: Subject to any disclaimer, the term of this patent is extended or adjusted under 35 U.S.C. 154(b) by 241 days.

(21) Appl. No.: 12/115,790

(22) Filed: May 6, 2008

(65) Prior Publication Data

US 2009/0161274 A1 Jun. 25, 2009

(30) Foreign Application Priority Data

Dec. 24, 2007 (TW) .............................. 96149690 A

(51) Int. Cl.
*H02H 9/00* (2006.01)
*H02H 3/22* (2006.01)
(52) U.S. Cl. ........................................ 361/56; 361/111
(58) Field of Classification Search .................... 361/56, 361/111
See application file for complete search history.

(56) References Cited

U.S. PATENT DOCUMENTS

| 5,852,541 A * | 12/1998 | Lin et al. ........................ 361/111 |
| 7,027,276 B2 * | 4/2006 | Chen ................................ 361/56 |
| 7,061,737 B2 * | 6/2006 | Chen ............................. 361/91.1 |
| 2006/0268473 A1 * | 11/2006 | Kemper .......................... 361/56 |

* cited by examiner

*Primary Examiner* — Stephen W Jackson
*Assistant Examiner* — Lucy Thomas
(74) *Attorney, Agent, or Firm* — Muncy, Geissler, Olds & Lowe, PLLC

(57) ABSTRACT

An ESD prevention circuit is provided. The ESD prevention circuit comprises a voltage source, a charge-blocking unit, a first PMOS transistor, a first NMOS transistor, a second NMOS transistor, and an output unit. The charge-blocking unit is coupled to the voltage source and provides a reverse voltage to control the voltage source to remain at a zero potential when an electrostatic voltage is being generated. The first PMOS transistor is coupled to the charge-blocking unit. The first NMOS transistor is coupled to the first PMOS transistor. The second NMOS transistor is coupled to the first PMOS transistor and the first NMOS transistor. The output unit is coupled to the second NMOS transistor. The electrostatic voltage is affected by the charge-blocking unit and does not raise impendence of the turned-on second NMOS transistor.

11 Claims, 6 Drawing Sheets

ELECTROSTATIC DISCHARGE PREVENTION CIRCUITS

BACKGROUND OF THE INVENTION

1. Field of the Invention

The invention relates to an electrostatic discharge protection circuit, and more particularly to an electrostatic discharge protection circuit for an output circuit.

2. Description of the Related Art

For general circuit design, a circuit set is required in a circuit for preventing the circuit from damage by static electricity from human bodies or the environment, which would reduce operating lifespan of the circuit.

The circuit set is usually referred to an electrostatic discharge (ESD) prevention circuit. In prior art, there are two types of ESD prevention circuit designs.

One circuit design disposes a Ballast resistor in the ESD prevention circuit, which prevents a parasitic NPN transistor from being non-uniformly turned on. Specifically, the disposition of the Ballast resistor decreases the non-uniform turned on condition of the parasitic NMOS.

The other circuit design disposes an ESD clamp circuit between power lines for conducting a portion or all of the currents. FIG. 1 is a conventional output circuit with an ESD clamp circuit. Referring to FIG. 1, an output circuit 1 comprises an ESD clamp circuit 11 coupled between a voltage source VCC and a ground terminal 12. The output circuit 1 further comprises a PMOS transistor 13, an NMOS transistor 14, a parasitic diode 15, and an output unit 16. A source of the PMOS transistor 13 is coupled to the voltage source VCC, and a drain thereof is coupled to the output unit 16. A source of the NMOS transistor 14 is coupled to the ground terminal 12, and a drain thereof is coupled to the output unit 16. The parasitic diode 15 is coupled to the voltage source VCC, and the output unit 16 is coupled to the parasitic diode 15. In a PS mode (ESD stress on the input or output pins with the VSS pin relatively grounded), the ESD clamp circuit 11 can conduct the electrostatic current to flow from the parasitic diode 15 sequentially to the voltage source VCC, the ESD clamp circuit 11, and the ground terminal 12, thereby decreasing damage from the electrostatic current.

For a large sized output circuit application, low on-state resistance (RDSON) is usually required, however, a Ballast resistor can increase RDSON. Assuming costs for a low RDSON requirement and a smaller layout size are considered usually, there is no Ballast resistor or a very small Ballast resistor in a large sized output circuit. Thus, a parasitic NPN transistor of an ESD prevention circuit of the example, will often be non-uniform turned on. When the non-uniform turned-on condition occurs in a large sized open drain NMOS (ODNMOS) transistor, the ESD problem of the output circuit becomes more serious. This is because an electrostatic discharge current has to pass through the NMOS transistor 14, rather than from the parasitic diode 15, due to not having a forward biased diode, and sequentially to the voltage source VCC, the ESD clamp circuit 11, and the ground terminal 12 of FIG. 1. FIG. 2 is an output circuit with large sized open drain NMOS (ODNMOS). Referring to FIG. 2, in an output circuit 2, a first parasitic capacitor 21 and a second parasitic capacitor 22 are used to provide voltage dividing, so that a first NMOS transistor 23 is turned on non-uniformly. In practice, however, the voltage source VCC is charged through the first parasitic capacitor 21 and a parasitic diode 25 when ESD occurs. When a capacitance between a voltage source VCC and a ground terminal is greater than the value of the first parasitic capacitor 21, the voltage source VCC is charged to an insufficiently high potential. Thus, making the potential of the gate of the first transistor 23 not high enough, and the impedance of the channel of the turned-on first NMOS transistor 23 too high, degrading the ESD protection. Additionally, when the second NMOS transistor 24 is in a turned-on state, the potential of the gate of the first transistor 23 is pulled to the ground terminal, and the ESD prevention is further degraded.

Meanwhile, following is another problem of the ESD prevention in a large sized output circuit application. When an ESD event test is preformed to pins, the ESD event test is passed in a PS-mode but failed in a positive I/O-to-I/O mode. This is because the potential of the gate of the first transistor 23 is pulled to a low logic level according to circuitry logic. FIG. 3 shows the correlation between an output circuit with large sized open drain NMOS and pins. Referring to FIG. 3, in an output circuit 3, potential of an input terminal 31 is lower than potential of a ground terminal 32. For an inverter S1, the lower potential serves as a low logic level. After an even-stage circuit, the (2n)th inverter S2n also outputs a low potential. Thus, lowering the potential of the gate of the first NMOS 23, and degrading the ESD prevention.

BRIEF SUMMARY OF THE INVENTION

An exemplary embodiment of an electrostatic discharge (ESD) prevention circuit for preventing an output circuit from being affected by an electrostatic voltage is provided. The ESD prevention circuit comprises a voltage source, a charge-blocking unit, a first P-type metal oxide semiconductor (PMOS) transistor, a first N-type metal oxide semiconductor (NMOS) transistor, a second NMOS transistor, and an output unit. The charge-blocking unit is coupled to the voltage source and provides a reverse voltage to control the voltage source to remain at a zero potential when the electrostatic voltage is being generated. The first PMOS transistor is coupled to the charge-blocking unit. The first NMOS transistor is coupled to the first PMOS transistor. The second NMOS transistor is coupled to the first PMOS transistor and the first NMOS transistor. The output unit is coupled to the second NMOS transistor. The electrostatic voltage is affected by the charge-blocking unit and does not raise impendence of the turned-on second NMOS transistor.

An exemplary embodiment of an electrostatic discharge (ESD) prevention circuit for preventing an output circuit from being affected by an electrostatic voltage is provided. The ESD prevention circuit comprises an output circuit, an NOR logic gate, an even-stage circuit, and a charge-blocking unit. The output circuit comprises a PMOS transistor, a first NMOS transistor, a second NMOS transistor, and an output unit, wherein a source of the second NMOS transistor is coupled to the output unit and a gate of the second NMOS transistor is coupled to the PMOS transistor. The NOR logic gate is coupled to the output circuit. The even-stage circuit is coupled to the NOR logic gate and comprises a plurality of inverters, wherein a number of the inverters is even. A level-rising circuit is coupled to the NOR logic gate for voltage source and blocking a correlation with the even-stage circuits coupled to the output circuit, so that an output of the NOR logic gate is at a high logic level.

An exemplary embodiment of an electrostatic discharge (ESD) prevention circuit for preventing the output circuit from being affected by an electrostatic voltage is provided. The output circuit comprises a voltage source, a charge-blocking unit, a first P-type metal oxide semiconductor (PMOS) transistor, a first N-type metal oxide semiconductor (NMOS) transistor, a second NMOS transistor, an NOR logic gate, an even-stage circuit, and a level-rising circuit. The charge-blocking unit is coupled to the voltage source and provides a reverse voltage to control the voltage source to remain at a zero potential when the electrostatic voltage is being generated. The first PMOS transistor is coupled to the charge-blocking unit. The first NMOS transistor is coupled to the first PMOS transistor. The second NMOS transistor is coupled to the first PMOS transistor and the first NMOS transistor. The NOR logic gate is coupled to the first PMOS transistor and the first NMOS transistor. The even-stage circuit is coupled to the NOR logic gate and comprises a plurality of inverters, wherein a number of the inverters is even. The level-rising circuit is coupled to the NOR logic gate and blocks a correlation with the even-stage circuits coupled to the output circuit, so that an output of the NOR logic gate is at a high logic level. The electrostatic voltage is affected by the charge-blocking unit and does not raise impendence of the turned-on second NMOS transistor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
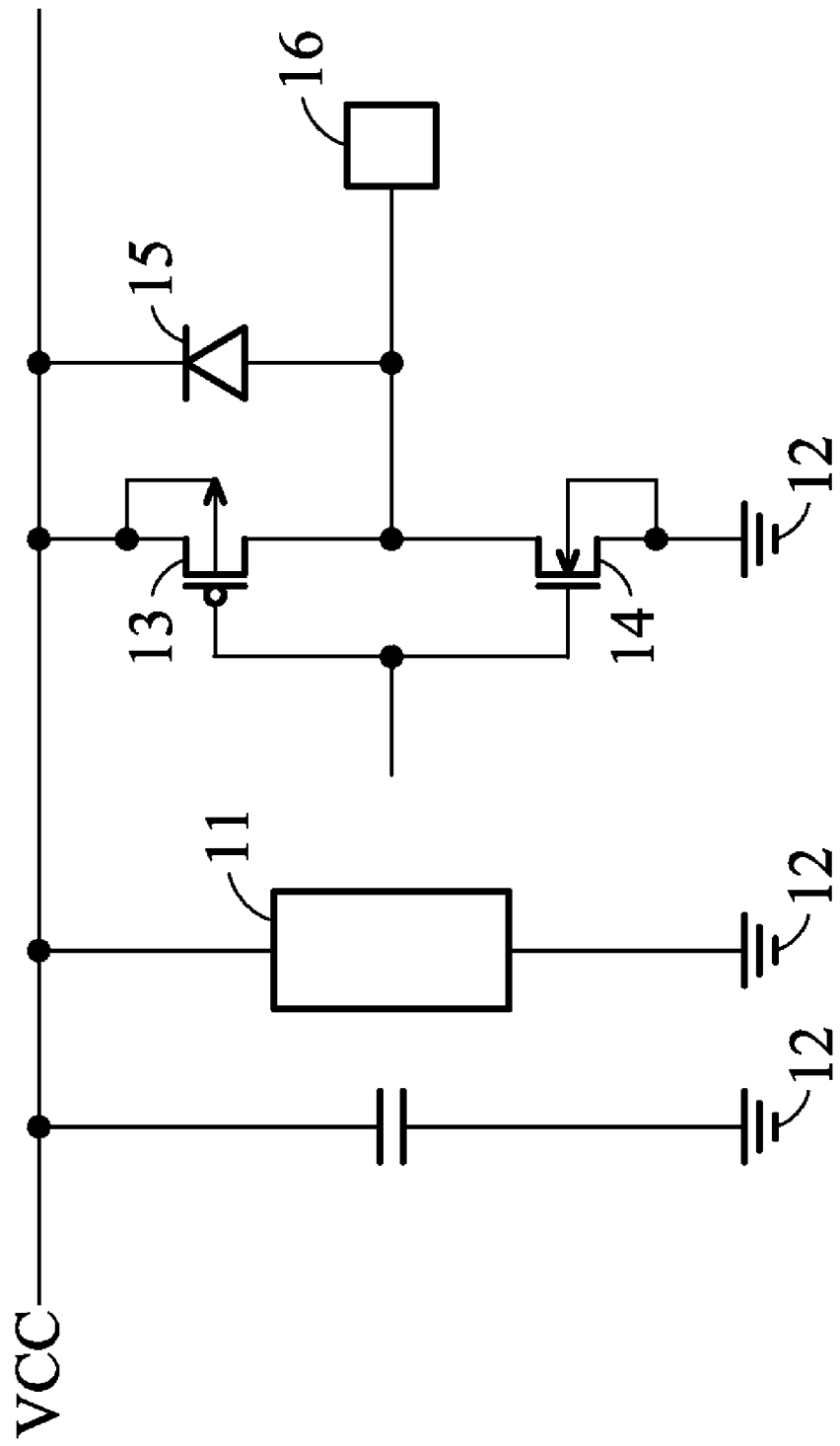
FIG. 1 is a conventional output circuit with an ESD clamp circuit.
Figure 2:
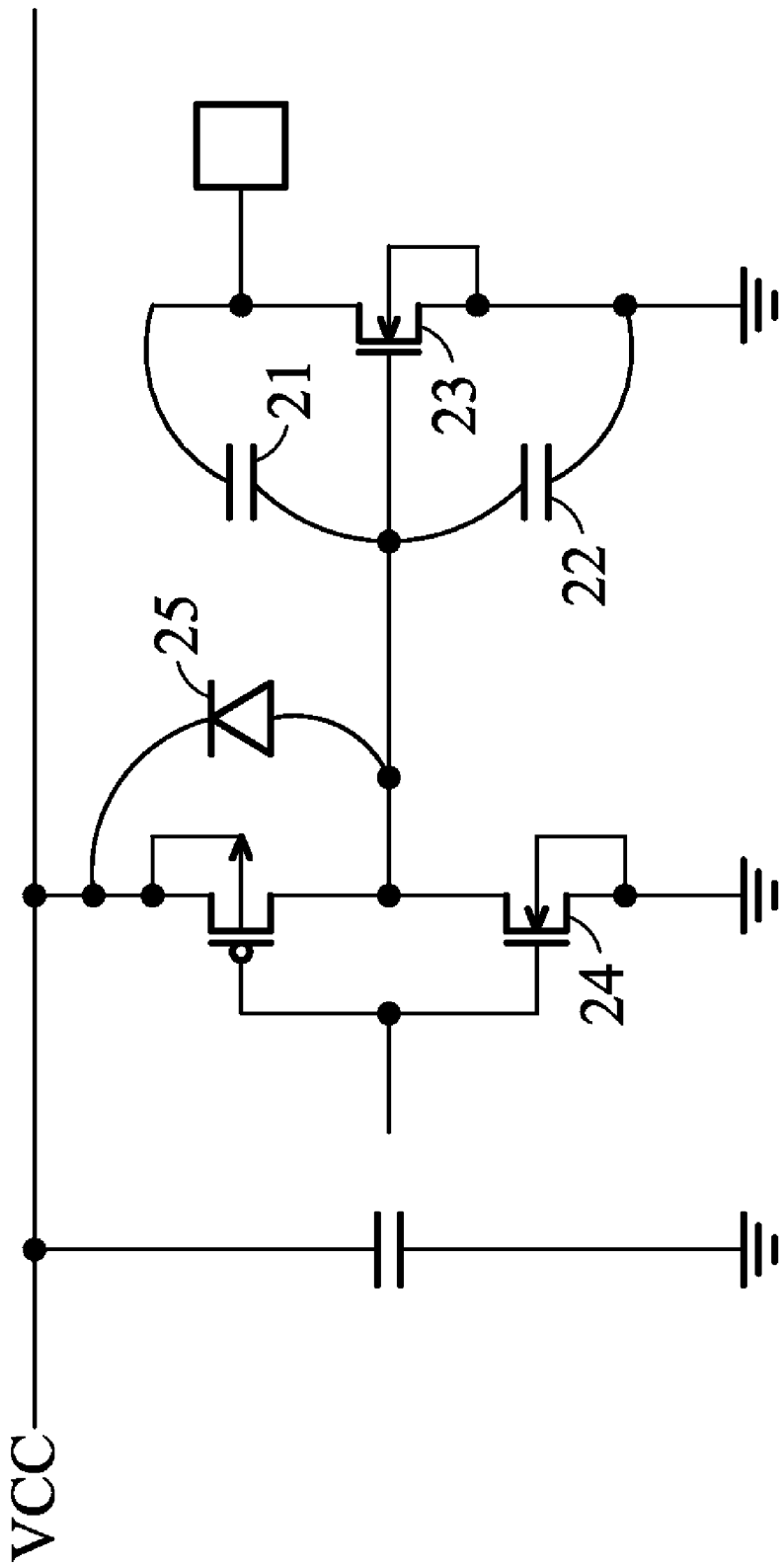
FIG. 2 is an output circuit with large sized open drain NMOS (ODNMOS)
Figure 3:
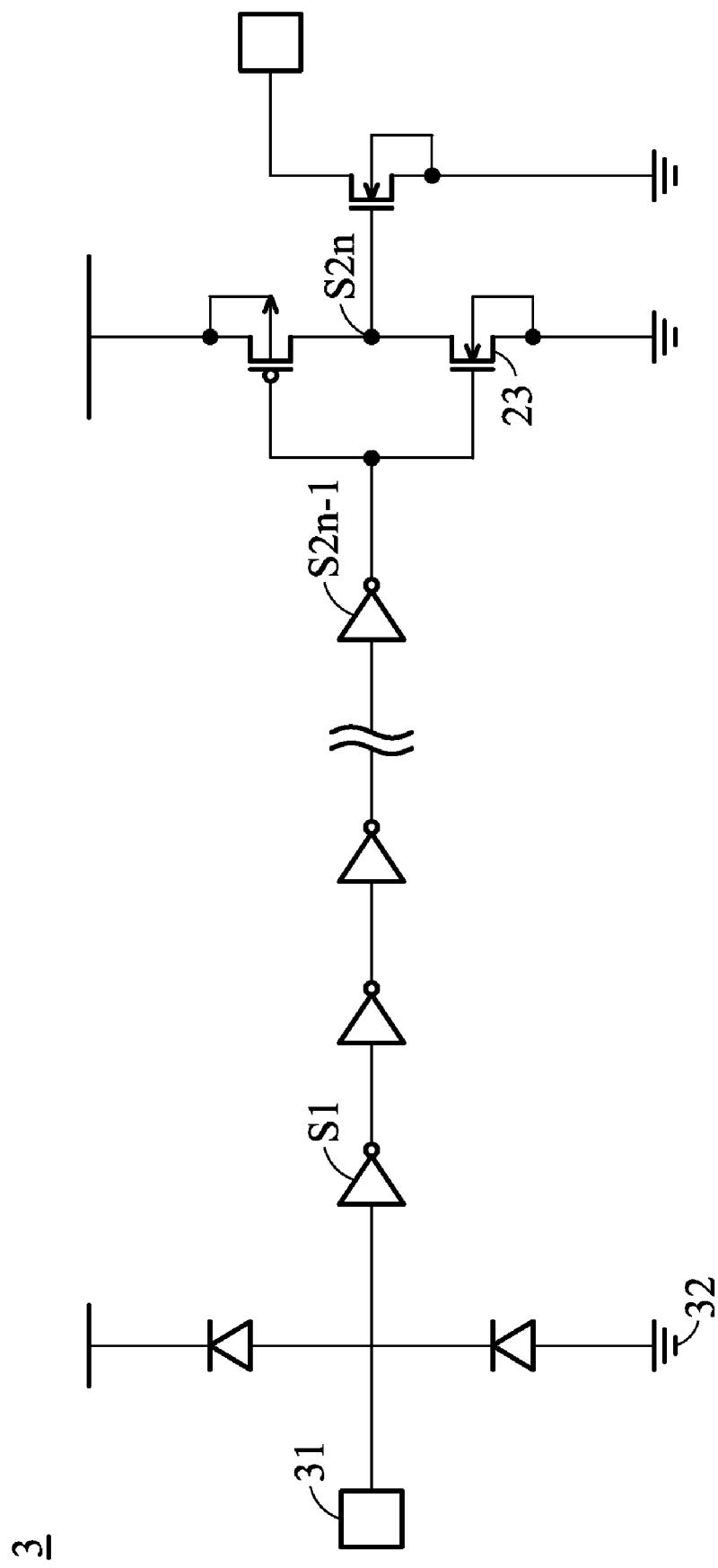
FIG. 3 shows the correlation between an output circuit with large sized open drain NMOSs and pins.
Figure 4:
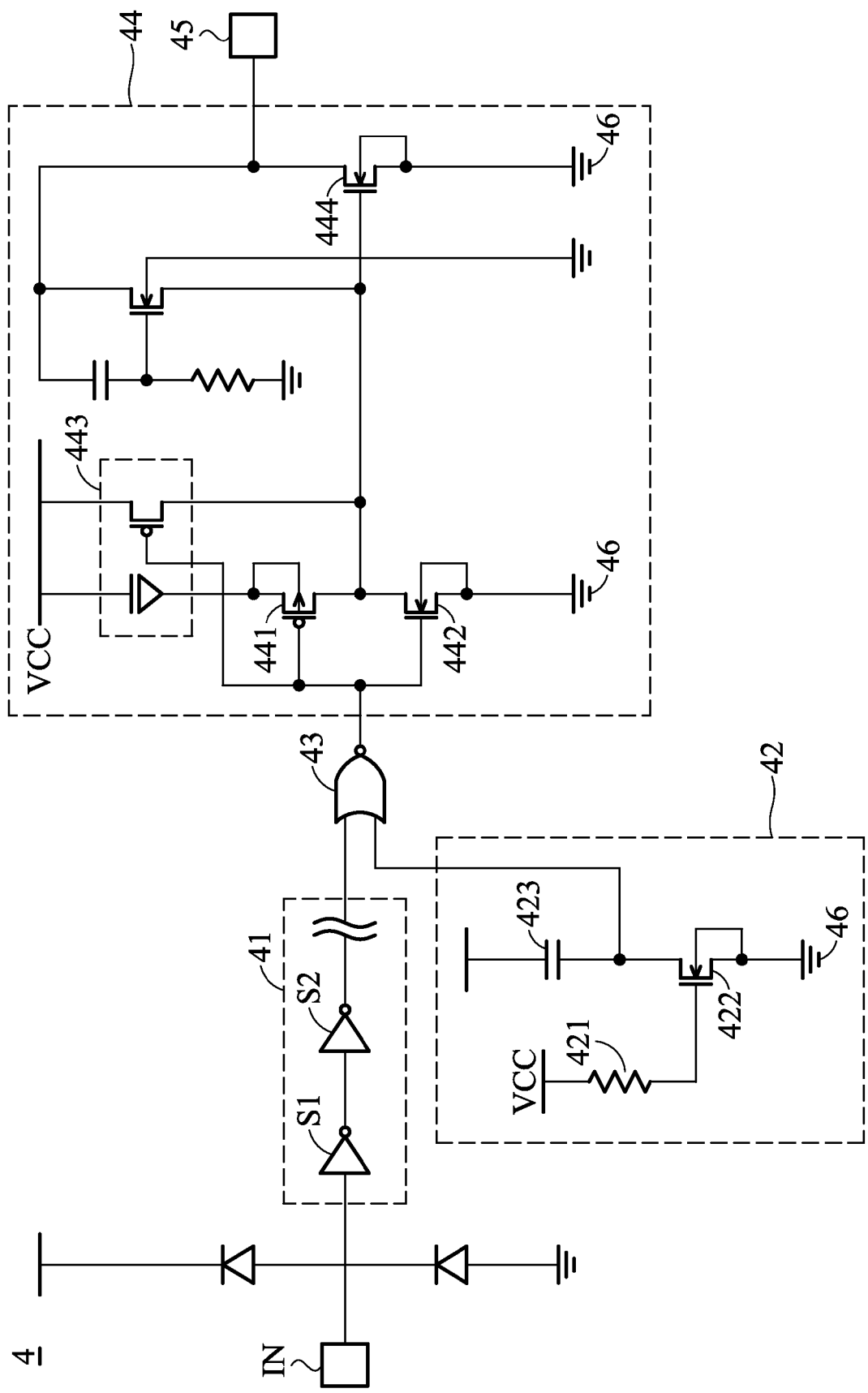
FIG. 4 is an exemplary embodiment of an ESD prevention circuit.

Electrostatic discharge (ESD) prevention circuits are provided. In an exemplary embodiment of an ESD prevention circuit in FIG. 4, an ESD prevention circuit 4 comprises an input terminal IN, an even-stage circuit 41, a level-rising circuit 42, an NOR logic gate 43, an output circuit 44, and an output unit 45.

The input terminal IN inputs an input voltage to the even-stage circuit 41 coupled to the input terminal IN. The even-stage circuit 41 comprises a plurality of inverters, such as an inverter S1, an inverter S2, and so on. The inverters are coupled in series to form the even-stage circuit 41, which is coupled to a first input terminal of the NOR logic gate 43.

A second input terminal of the NOR logic gate 43 is coupled to the level-rising circuit 42. The level-rising circuit 42 comprises a voltage source VCC, a resistor 421, a third N-type metal oxide semiconductor (NMOS) transistor 422, a first capacitor 423, and a ground terminal 46. One terminal of the resistor 421 is coupled to the voltage source VCC, and the other terminal thereof is coupled to a gate of the third N-type metal oxide semiconductor (NMOS) transistor 422. A drain of the third NMOS transistor 422 is coupled to one terminal of the first capacitor 423, and a source thereof is coupled to the ground terminal 46. The second input terminal of the NOR logic gate 43 is coupled between the first terminal of the first capacitor 423 and the drain of the third NMOS transistor 422. Due to the level-rising circuit 42, the correlation between the ESD prevention circuit 4 and even-stage circuits coupled to other pins is blocked, preventing the output of the NOR logic gate 43 from being at a high level due to the even-stage circuit 41. The level-rising circuit 42 pulls the output of NOR logic gate 43 to a low logic level during ESD event.

The output circuit 44 is coupled to an output terminal of the NOR logic gate 43 and comprises a first P-type metal oxide semiconductor (PMOS) transistor 441, a first NMOS transistor 442, a charge-blocking unit 443, a second NMOS transistor 444, and the voltage source VCC. Gates of the first PMOS transistor 441 and the first NMOS transistor 443 are coupled together to the output terminal of the NOR logic gate. The first PMOS transistor 441 is coupled to the charge-blocking unit 443 and a drain of the first NMOS transistor 442. A source of the first NMOS transistor 442 is coupled to the ground terminal 46. The charge-blocking unit 443 is coupled to the voltage source VCC. A gate of the second NMOS transistor 444 is coupled to a drain of the first PMOS transistor 441 and the drain of the first NMOS transistor 442, and a source thereof is coupled to the output unit 45, and a source thereof is coupled to the ground terminal 46.

When an ESD event occurs, the charge-blocking unit 443 can block the voltage source VCC from being charged due to generation of the electrostatic voltage, so that the voltage source VCC remains at a zero potential. Since the voltage source VCC remains at the zero potential, the gate of the second NMOS transistor 444 is not at an insufficiently high potential. Thus, decreasing of the potential of the gate of the second NMOS transistor 444 due to prevention of voltage dividing, so that impedance of the channel of the turned-on second NMOS transistor 444 is lowered. Moreover, since the first NMOS transistor 442 is also not turned on, the potential of the gate of the first NMOS transistor 442 can not be pulled to the potential of the ground terminal 46, providing improved ESD prevention.

Figure 5C:
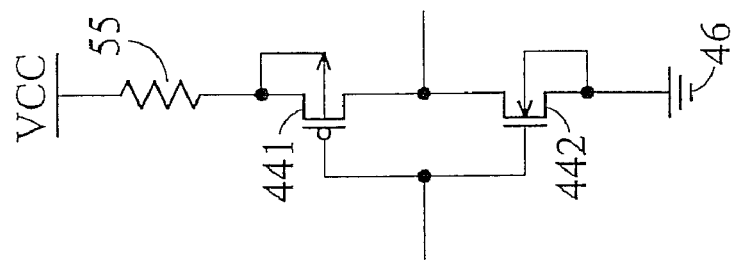
FIGS. 5a-5f are exemplary embodiments of the charge-blocking unit in the ESD prevention circuit of FIG. 4.
Figure 5B:
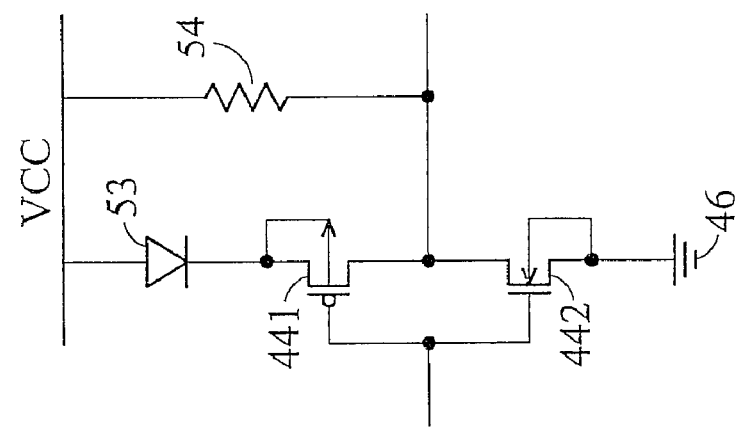
Figure 5A:
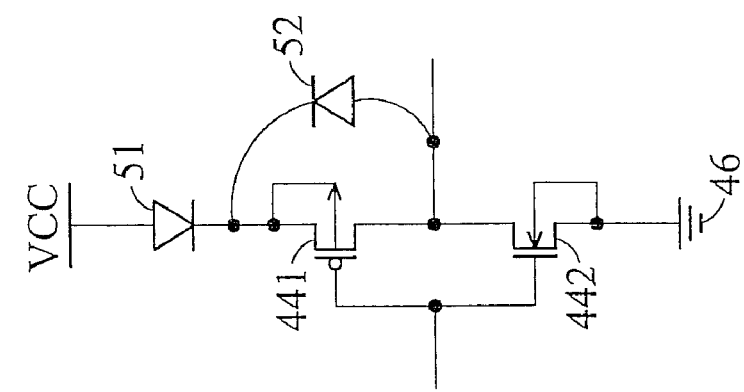
Figure 5F:
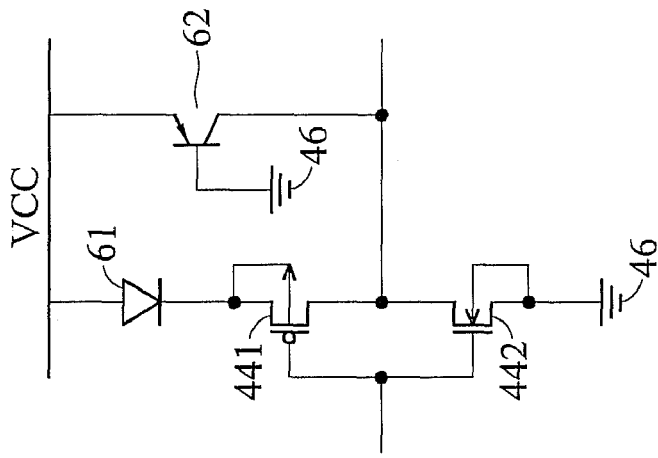
Figure 5E:
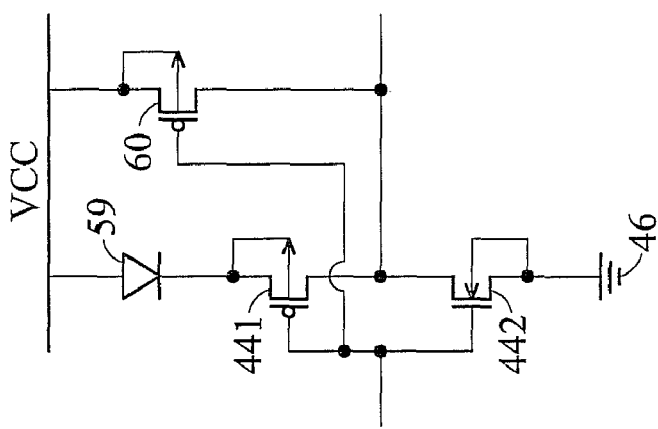
Figure 5D:
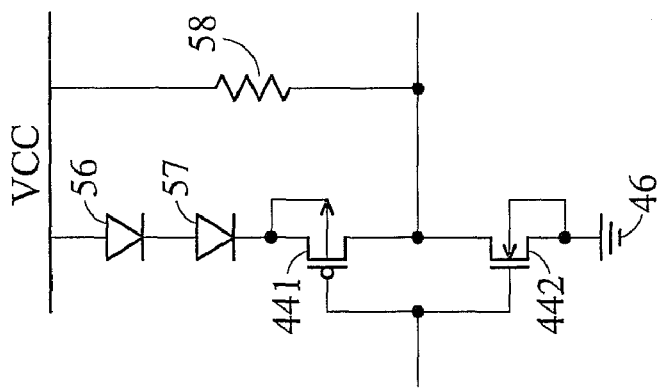

FIGS. 5a-5f are exemplary embodiments of the charge-blocking unit in the ESD prevention circuit 4. Referring to FIG. 5a, a charge-blocking unit comprises a first diode 51 and a second parasitic diode 52. One terminal of the first diode 51 is coupled to the voltage source VCC, and the other terminal thereof is coupled to the source of the first PMOS transistor 441. The second parasitic diode 52 is coupled between the first diode 51 and the drain of the first PMOS transistor 441. The drain of the first NMOS transistor 442 is coupled to the drain of the first PMOS transistor 441. The first diode 51 is used to block a charge path of the voltage source VCC as the electrostatic voltage is generated, so that the voltage source VCC remains at the zero potential.

Referring to FIG. 5(b), another charge-blocking unit comprises a third diode 53 and a first high impedance resistor 54. One terminal of the third diode 53 is coupled to the voltage source VCC, and the other terminal thereof is coupled to the source of the first PMOS transistor 441. One terminal of the first high impedance resistor 54 is coupled to the voltage source VCC, and the other thereof is coupled to the drain of the first PMOS transistor 441. The third diode 53 and the first high impedance resistor 54 are used to block a charge path of the voltage source VCC as the electrostatic voltage is being generated, so that the voltage source VCC remains at the zero potential.

Referring to FIG. 5(c), another charge-blocking unit comprises a second high impedance resistor 55. One terminal of the second high impedance resistor 55 is coupled to the voltage source VCC, and the other terminal thereof is coupled to the source of the first PMOS transistor 441. The second high impedance resistor 55 is used to block a charge path of the voltage source VCC as the electrostatic voltage is being generated, so that the voltage source VCC remains at the zero potential.

Referring to FIG. 5(*d*), another charge-blocking unit comprises a fourth diode 56, a fifth diode 57, and a third high impedance resistor 58. One terminal of the fourth diode 56 is coupled to the voltage source VCC, and the other terminal thereof is coupled to one terminal of the fifth diode 57. The other terminal of the fifth diode 57 is coupled to the source of the first PMOS transistor 441. One terminal of the third high impedance resistor 58 is coupled to the voltage source VCC, and the other thereof is coupled to the drain of the first PMOS transistor 441. The fourth diode 56, the fifth diode 57, and the third high impedance resistor 58 are used to block a charge path of the voltage source VCC as the electrostatic voltage is being generated, so that the voltage source VCC remains at the zero potential.

Referring to FIG. 5(*e*), another charge-blocking unit comprises a sixth diode 59 and a third PMOS transistor 60. One terminal of the sixth diode 59 is coupled to the voltage source VCC, and the other terminal thereof is coupled to the source of the first PMOS transistor 441. The third PMOS transistor 60 has a long channel and an exceedingly small drain. A source of the third PMOS transistor 60 is coupled to the voltage source VCC, a gate thereof is coupled to the gate of the first PMOS transistor 441, and the drain thereof is coupled to the drain of the first PMOS transistor 441. The sixth diode 59 and a third PMOS transistor 60 are used to block a charge path of the voltage source VCC as the electrostatic voltage is being generated, so that the voltage source VCC remains at the zero potential.

Referring to FIG. 5(*f*), another charge-blocking unit comprises a seventh diode 61 and a first transistor 62. One terminal of the seventh diode 61 is coupled to the voltage source VCC, and the other terminal thereof is coupled to the source of the first PMOS transistor 441. An emitter of the first transistor 62 is coupled to the voltage source VCC, a base thereof is coupled to the ground terminal 46, and the collector thereof is coupled to the drain of the first PMOS transistor 441. The seventh diode 61 and the first transistor 62 are used to block a charge path of the voltage source VCC as the electrostatic voltage is being generated, so that the voltage source VCC remains at the zero potential.

As described above, the charge-blocking units as shown in FIGS. 5(*a*)-5(*f*) can effectively block the voltage source VCC from charging due to the generation of electrostatic voltage, so that the voltage source VCC remains at a zero potential. Since the voltage source VCC remains at the zero potential, the gate of the second NMOS transistor 444 is not at an insufficiently high potential. Thus, decreasing of the potential of the gate of the second NMOS transistor 444, due to prevention of voltage dividing, so that impedance of the channel of the turned-on second NMOS transistor 444 is lower. Moreover, since the first NMOS transistor 442 is also not turned on, the potential of the gate of the first NMOS transistor 442 can not be pulled to the potential of the ground terminal 46, providing improved ESD prevention. The charge-blocking units as shown in FIGS. 5(*a*)-5(*f*) are exemplary embodiments of the charge-blocking unit in the ESD prevention circuit 4, without limitation in practice. Any circuit which can stop a voltage source from charging to avoid degrading ESD prevention, can serve as the charge-blocking unit in the ESD prevention circuit 4.

For a conventional ESD prevention circuit, problems because an inverter within outputs a low logic level or because a potential of a gate of an NMOS transistor within is too low or turned on non-uniformly, can be mitigated with the embodiments of the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrostatic discharge (ESD) prevention circuit for preventing an output circuit from being affected by an electrostatic voltage, and the ESD prevention circuit comprising:
   an output circuit comprising a first P-type metal oxide semiconductor (PMOS) transistor, a first N-type metal oxide semiconductor (NMOS) transistor, a second NMOS transistor, and an output unit, wherein a drain of the second NMOS transistor is coupled to the output unit and a gate of the second NMOS transistor is coupled to the PMOS transistor;
   a NOR logic gate coupled to the output circuit;
   an even-stage circuit coupled to the NOR logic gate and comprising a plurality of inverters, wherein a number of the inverters is even; and
   a level-rising circuit, coupled to the NOR logic gate for a voltage source, and for blocking a correlation with the even-stage circuits coupled to the output circuit, so that an output of the NOR logic gate is at a low logic level.

2. The ESD prevention circuit as claimed in claim 1, wherein the electrostatic discharge prevention circuit further comprises an input unit coupled to the even stage circuit for providing an input voltage.

3. The ESD prevention circuit as claimed in claim 1, wherein the level-rising circuit comprises a voltage source, a resistor, a third NMOS transistor, a capacitor and a ground terminal, the resistor is coupled to the voltage source and a gate of the third NMOS transistor, a drain of the third NMOS transistor is coupled to the capacitor, and a source of the third NMOS transistor is coupled to the ground terminal.

4. An electrostatic discharge (ESD) prevention circuit for preventing the output circuit from being affected by an electrostatic voltage, and the output circuit comprising:
   a voltage source;
   a charge-blocking unit coupled to the voltage source;
   a first P-type metal oxide semiconductor (PMOS) transistor coupled to the charge-blocking unit;
   a first N-type metal oxide semiconductor (NMOS) transistor coupled to the first PMOS transistor;
   a second NMOS transistor coupled to the first PMOS transistor and the first NMOS transistor;
   a NOR logic gate coupled to the first PMOS transistor and the first NMOS transistor;
   an even-stage circuit coupled to the NOR logic gate and comprising a plurality of inverters, wherein a number of the inverters is even; and
   a level-rising circuit, coupled to the NOR logic gate for blocking a correlation with the even-stage circuits is coupled to the output circuit, so that an output of the NOR logic gate is at a low logic level,
   wherein the charge-blocking unit provides a reverse voltage to control the voltage source to remain at a zero potential when the electrostatic voltage is being generated at the output unit, and the electrostatic voltage does not raise impendence of the second NMOS transistor turned on by the electrostatic voltage when the electrostatic voltage is being generated at the output unit.

5. The electrostatic discharge prevention circuit as claimed in claim 4, wherein the charge-blocking unit comprises a first diode.

6. The electrostatic discharge prevention circuit as claimed in claim 5, wherein the charge-blocking unit further comprises a second diode coupled to a gate and a drain of the first PMOS transistor.

7. The electrostatic discharge prevention circuit as claimed in claim 4, wherein the charge-blocking unit comprises a diode and a high impedance resistor which is coupled to the first PMOS transistor and the first NMOS transistor.

8. The electrostatic discharge prevention circuit as claimed in claim 4, wherein the charge-blocking unit is implemented by a high impedance resistor.

9. The electrostatic discharge prevention circuit as claimed in claim 4, wherein the charge-blocking unit is mainly implemented by a first diode and a second diode coupled in series.

10. The electrostatic discharge prevention circuit as claimed in claim 4, wherein the electrostatic discharge prevention circuit further comprises an input unit coupled to the even stage circuit for providing an input voltage.

11. The electrostatic discharge prevention circuit as claimed in claim 4, wherein the level-rising circuit comprises a voltage source, a resistor, a third NMOS transistor, a capacitor and a ground terminal, the resistor is coupled to the voltage source and a gate of the third NMOS transistor, a drain of the third NMOS transistor is coupled to the capacitor, and a source of the third NMOS transistor is coupled to the ground terminal.

* * * * *